United States Patent
Jalali et al.

(10) Patent No.: US 12,136,814 B1
(45) Date of Patent: Nov. 5, 2024

(54) OPTICAL WIRELESS POWER GRID SYSTEM AND METHOD FOR COMMUNICATION, SENSOR, AND IOT DEVICES

(71) Applicant: WIRELESS PHOTONICS, LLC, El Segundo, CA (US)

(72) Inventors: Bahram Jalali, Los Angeles, CA (US); William R Ryan, Los Angeles, CA (US); Ahmadreza Rofougaran, Newport Coast, CA (US)

(73) Assignee: Wireless Photonics, LLC, El Segundo, CA (US)

( * ) Notice: Subject to any disclaimer, the term of this patent is extended or adjusted under 35 U.S.C. 154(b) by 0 days.

(21) Appl. No.: 18/626,696

(22) Filed: Apr. 4, 2024

(51) Int. Cl.
*H02J 13/00* (2006.01)

(52) U.S. Cl.
CPC .. *H02J 13/00019* (2020.01); *H02J 13/00001* (2020.01); *H02J 13/00034* (2020.01)

(58) Field of Classification Search
CPC .......... H02J 13/00019; H02J 13/00001; H02J 13/00034; H02J 50/30
See application file for complete search history.

(56) References Cited

U.S. PATENT DOCUMENTS

| | | | |
|---|---|---|---|
| 2004/0142733 A1* | 7/2004 | Parise | B60L 53/11 455/572 |
| 2009/0016715 A1* | 1/2009 | Furey | H04B 10/807 398/38 |
| 2009/0320113 A1* | 12/2009 | Larsen | H04L 63/08 709/227 |
| 2016/0359330 A1* | 12/2016 | Jin | H02J 7/35 |
| 2017/0150437 A1* | 5/2017 | Cannizzaro | H04W 52/0206 |
| 2023/0216355 A1* | 7/2023 | Bodurka | H02J 50/12 307/104 |

* cited by examiner

*Primary Examiner* — Rexford N Barnie
*Assistant Examiner* — Thai H Tran
(74) *Attorney, Agent, or Firm* — Mark Kendrick

(57) ABSTRACT

A wireless optical power network for power distribution to a plurality of devices includes a power source to generate electrical power; the one or more master power stations configured to receive the electrical power and to generate a plurality of power laser light beams based at least in part on the electrical power; one or more optical distribution devices, the one or more optical distribution devices to receive the plurality of laser light beams; one or more sink power substations optically coupled to the one or more optical distribution devices, the one or sink power substations configured to receive the plurality of laser beams via the one or more optical distribution devices, to convert the plurality of laser beams to substation electrical power and to transfer the substation electrical power; and a plurality of end user devices to receive the substation electrical power for charging.

20 Claims, 7 Drawing Sheets

OPTICAL WIRELESS POWER GRID SYSTEM AND METHOD FOR COMMUNICATION, SENSOR, AND IOT DEVICES

CROSS-REFERENCE TO RELATED APPLICATIONS/INCORPORATION BY REFERENCE

None.

FIELD OF TECHNOLOGY

The claimed subject matter and technology is related to optical wireless power grid system or network and method for communication, sensor and Internet of Things devices.

BACKGROUND

Obtaining additional power for specific indoor areas has always been difficult due to a due to a requirement of laying cables either within walls or structures (and thus requiring construction) or outside of walls (which creates an unpleasing design aesthetic). In addition, it is always difficult to get work done in existing indoor buildings and thus there may be long lead times required to have any new networking components installed. Thus, there is a need for wireless optical power distribution in indoor areas. In addition, wireless communication inside buildings itself is limited by the range in which wireless signals degrade in quality over distance traveled. As an example, a 3,000 square foot house normally requires a router and a mesh network because a wireless range of the router will be insufficient to supply strong wireless signals to all areas of a house or structure. Accordingly, a need exists to have an efficient indoor networking technology that does not require extensive construction within the facility, does not require a large amount of wiring and that can communicate quality power communication signals over large distances.

DETAILED DESCRIPTION OF THE DISCLOSURE

The following detailed description provides a better understanding of the features and advantages of the subject matter described in the present disclosure in accordance with the embodiments disclosed herein. The following detailed description describes a method and system that utilizes opto-mechanical electronic assemblies to improve communications within indoor environments and/or large controlled environments.

In the following description, reference is made to the accompanying drawings, which form a part hereof, and in which is shown, by way of illustration, various embodiments of the present disclosure.

Figure 1:
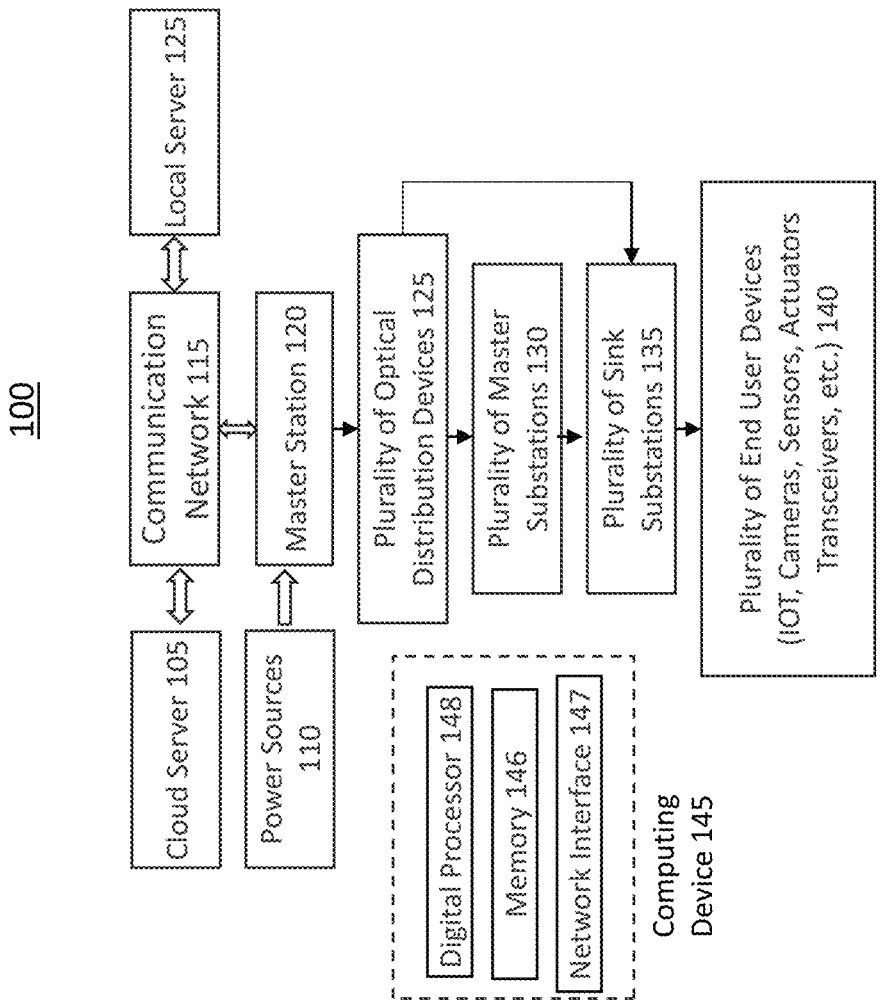
FIG. 1 is a block diagram that illustrates various components of an optical wireless power grid system for providing power to communication devices, sensor devices and Internet of Things (IoT) devices, in accordance with exemplary embodiments of the disclosure.

FIG. 1 is a block diagram that illustrates various components of an optical wireless power grid system for providing power to communication devices, sensor devices and Internet of Things (IoT) devices, in accordance with exemplary embodiments of the disclosure. Although only one optical wireless power grid system 100 is shown in FIG. 1, the optical wireless power grid system may include tens, hundreds and/or thousands of components as described below. In other words, there may be tens, hundreds or thousands of master power stations (and associated optical distribution devices, master power substations, sink power substations, and end user devices).

In exemplary embodiments, the optical wireless power grid system 100 may include one or more one or more power sources 105, one or more master power stations 120, a plurality of optical distribution devices 125, a plurality of master substations 130, a plurality of sink power substations 135, and/or a plurality of end user computing devices 140. In exemplary embodiments, the optical wireless grid network 100 may include one or more computing devices 145. In some implementations, the one or more computing devices 145 may include one or more processors 148, one or more memory devices 146, computer-readable instructions executable by the one or more processors, and/or one or more network interfaces 147 such as wireless communication transceivers.

In exemplary embodiments, the one or more power sources 110 may be coupled and/or connected to the one or more master power stations 120. In some implementations, the one or more power sources 110 may include an alternating current (AC) power outlet, a Power over Ethernet (POE) device, one or more solar cells, one or more wind generators, and/or an electrical generator. In exemplary embodiments, the one or more power sources 105 may provide AC power or DC power to the one or more master power stations 120.

In exemplary embodiments, the one or more master power stations 120 may be optically coupled to the plurality of optical distribution devices 125. In exemplary embodiments, the one or more master power stations 120 may receive electrical power from the power sources 105 and may utilize the electrical power to provide power to one or more power lasers in the one or more master power stations 120. In these implementations, the one or more power lasers may generate a plurality of power laser light beams.

In exemplary embodiments, the plurality of optical distribution devices 125 may be optically coupled to a plurality of sink power substations 135. In exemplary embodiments, the plurality of optical distribution devices 125 may be free space optical channels, one or more PVC (polyvinal chloride) pipes or other pipes or tubing, one or more waveguides, or one or more optical fibres. In exemplary embodiments, one or more optical distribution devices 125 may receive the plurality of power laser light beams from the one or more master power stations 120 and direct or transmit the plurality of power laser light beams to the plurality of sink power substations 135.

In exemplary embodiments, the plurality of sink power substations 135 may be coupled and/or connected to a plurality of end user devices 140. In exemplary embodiments, the plurality of sink power substations 135 may include a power storage module, a battery charger controller, and one or more batteries. In exemplary embodiments, the power storage module may include a laser energy harvesting cell. In these embodiments, the laser energy harvesting cell may convert the plurality of laser light beams into the substation electrical power and may transfer the substation electrical power to a battery charger controller. In exemplary embodiments, the battery charger controller may charge the one or more batteries. In exemplary embodiments, the one or more batteries or the battery charger controller may provide power to one or more end user devices 140 (which may be referred to as the load).

In exemplary embodiments, the one or more end use devices 140 may be IoT devices, imaging devices (cameras), sensor devices, actuators, wireless communication transceivers, and/or switching devices. In exemplary embodiments, the one or more batteries may provide DC power to the plurality of end user devices.

In exemplary embodiments, the plurality of optical distribution devices 125 may be optically coupled to a plurality of master power substations 130, rather than directly to a plurality of sink power substations 135. In some implementations, an optical splitter or other optical distribution device 125 may be coupled between one or more master power stations 120 and one or more master power substations 130. In exemplary embodiments, the plurality of optical distribution devices 130 may be free space optical channels, one or more PVC (polyvinal chloride) pipes or other pipes, one or more optical waveguides, or one or more optical fibres. In exemplary embodiments, one or more optical distribution devices 125 may receive the plurality of power laser light beams and direct or transmit the plurality of power laser light beams to the plurality of master power substations 130.

In exemplary embodiments, the plurality of master power substations 130 may be coupled and/or connected to a plurality of end user devices 140. In other words, like the sink power substations 135, the plurality of master power substations 130 may provide power to end user devices. In exemplary embodiments, the one or more master power substations 135 may include a power storage module, a battery charger controller, and one or more batteries. In exemplary embodiments, the power storage module may include a laser energy harvesting cell. In these embodiments, the laser energy harvesting cell may convert the plurality of laser light beams into master electrical power and may transfer the master electrical power to a battery charger controller. In exemplary embodiments, the battery charger controller may charge the one or more batteries in the master power substation(s) 130. In exemplary embodiments, the one or more batteries may provide power to one or more end user devices 140 (which may be referred to as the load). In exemplary embodiments, the one or more master power substations 130 may be optically coupled to additional optical distribution devices (not shown). In exemplary embodiments, the one or more master power substations 130 may receive the master electrical power from batteries or power storage modules in the master power substation 130 and may utilize the electrical power to provide power to one or more power lasers in the one or more master power substations 130. In these implementations, the one or more power lasers may generate a plurality of master power laser light beams. In exemplary embodiments, the plurality of additional optical distribution devices may be optically coupled to one or more additional sink power substations 135. In exemplary embodiments, the plurality of additional optical distribution devices may be free space optical channels, one or more PVC (polyvinal chloride) pipes or other pipes or tubing, one or more optical waveguides and/or one or more optical fibres. In exemplary embodiments, one or more additional optical distribution devices may receive the plurality of master power laser light beams and direct or transmit the plurality of master power laser light beams to the one or more additional sink power substations 135.

In exemplary embodiments, the wireless optical power network 100 may include a local server computing device 125 (or one or more local server computing devices). In exemplary embodiments, the local server computing device 125 may include one or more processors, one or more memory devices, computer-readable instructions stored on the one or more memory devices and/or one or more network interfaces (such as wireless or wired communication transceivers). In some implementations, the computer-readable instructions may be executable by the one or more processors in the local server computing device 125 to control operations of components within the wireless optical power network 100. Examples of operations of components may include the executable computer-readable instructions controlling laser power output by master power stations 120 or master power substations 130; controlling a charging schedule of batteries located in master power substations 130 and master power sink substations 135; coordinating power delivery through the wireless optical power network 100 by switching on and off different devices or components; monitoring operations of various optical distribution devices 125, master power stations 120, master power substations 130, and sink power substations 135; and/or communicating status of the master power stations 120, optical distribution devices 125, master power substations 130 and sink power substations 135 to one or more local server computing devices 125 or one or more cloud computing devices 105.

In exemplary embodiments, a cloud server computing device 105 (or a plurality of cloud server computing devices 105) may be communicatively coupled to the local server computing device 125 (or plurality of cloud server computing devices 105) through a communication network or a wireless communication network 115. In exemplary embodiments, the cloud server computing device 105 (or plurality of cloud server computing devices 105) may be communicatively coupled to other components and systems of the wireless optical power network 100. In exemplary embodiments, the cloud server computing device 105 may include one or more processors, one or more memory devices, computer-readable instructions stored on the one or more memory devices and/or one or more network interfaces and/or wireless communication transceivers. In some implementations, the computer-readable instructions may be executable by the one or more processors of the cloud server computing device to control operations of components within the wireless optical power network 100. Examples of operations of components may include the executable computer-readable instructions of the cloud server computing device 105 controlling laser power output by master power stations 120 or master power substations 130; controlling charging schedule of batteries located in master power substations 130 and master power sink substations 135; coordinating power delivery through the wireless optical power network 100 by switching on and off different devices or components; monitoring operations of various optical distribution devices 125, master power stations 120, master power substations 130, and sink power substations 135; and/or storing operational or status parameters of the different parts of the wireless optical power network 100 which includes master stations, optical distribution devices, master power substations and sink power substations.

Figure 2:
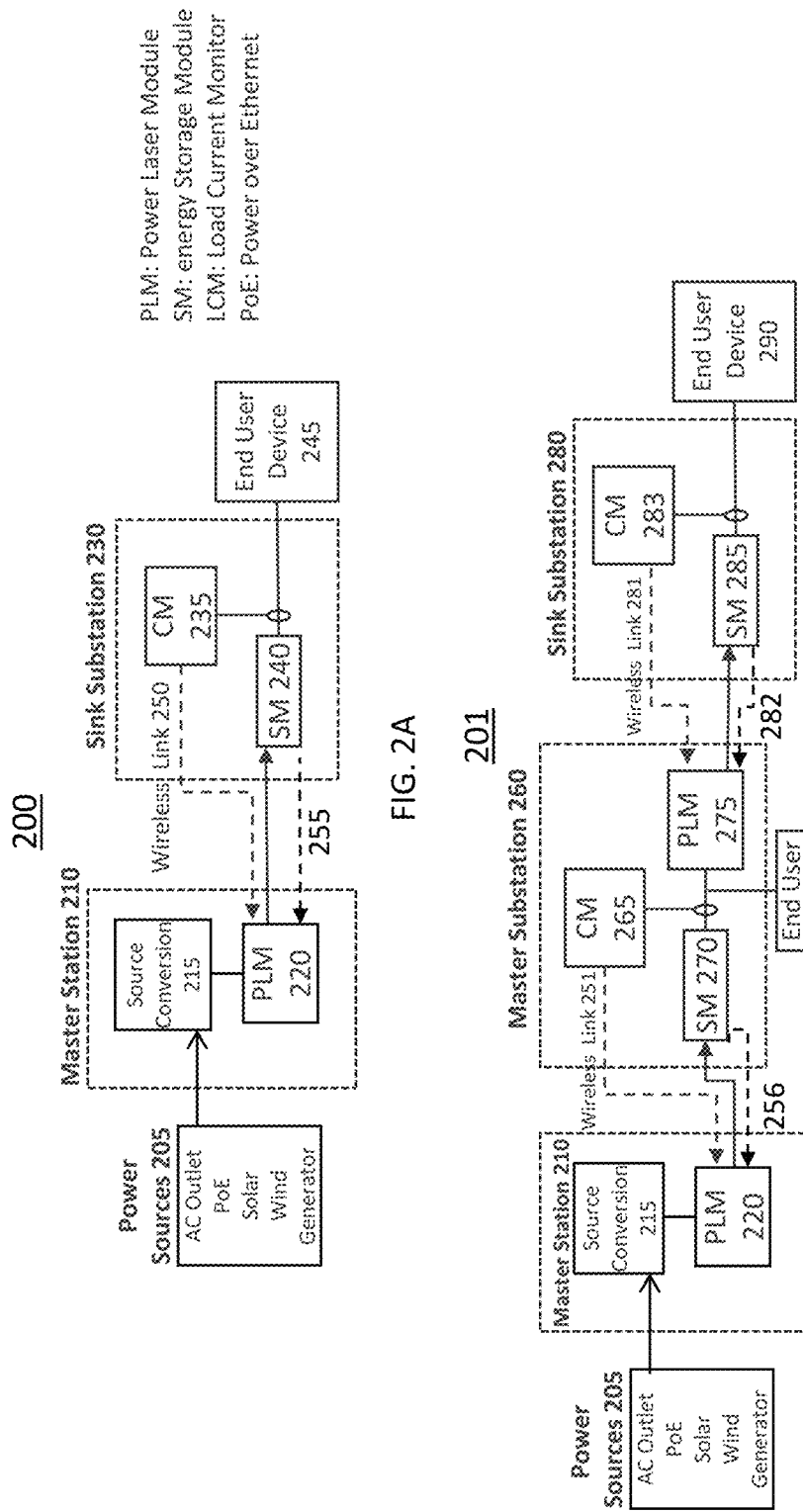
FIG. 2A illustrates a block diagram of a wireless optical power system or grid including one or more master power stations and one or more sink power substations according to exemplary embodiments.
FIG. 2B illustrates a block diagram of a wireless optical power system or grid including one or more master power stations, one or more master power substations and one or more sink power substations according to exemplary embodiments.

FIG. 2A illustrates a block diagram of a wireless optical power system or grid including one or more master power stations and one or more sink power substations according to exemplary embodiments. In the embodiments illustrated in FIG. 2A, the wireless optical power system or grid 200 includes one or more power sources 205, one or more master power stations 210, one or more sink power substations 230, and a plurality of end user devices 245.

In exemplary embodiments, the one or more master power stations 210 may be connected or coupled to one or more power sources 205. In exemplary embodiments, the one or more master power stations 210 may include one or more power or source conversion modules 215 and one or more power laser modules 220. In exemplary embodiments, the one or more power conversion modules 215 may be connected or coupled to the one or more power laser modules 220. In exemplary embodiments, the one or more power conversion modules 215 may be configured to receive or may receive the electrical power from the one or more power sources, may convert the received electrical power and may transfer the received converted electrical power to the one or more power laser modules 220. In exemplary embodiments, the one or more power laser modules 220 may be configured to or may generate a plurality of power laser light beams.

In exemplary embodiments, one or more optical distribution devices may be optically coupled between the one or more master power stations 210 and the one or more sink power substations 230. In some implementations, the one or more optical distribution devices may be one or more free space optical channels, one or more PVC pipes or tubing, one or more optical waveguides, or one or more optical fibers. In exemplary embodiments, the plurality of power laser light beams may be communicated through the one or more optical distribution devices to the one or more power sink substations 230.

In exemplary embodiments, the one or more sink power substations 230 include one or more power storage modules 240, one or more current monitor modules 235, one or more battery charger controllers, one or more batteries, one or more microprocessors or processors/controllers, one or more memory devices, and computer-readable instructions stored on the one or more memory devices. In exemplary embodiments, the one or more power storage modules 240 may include a laser energy harvesting cell configured to receive the plurality of power laser light beams and convert the plurality of power laser light beams (received from the master power station 210) into substation electrical power. In exemplary embodiments, the laser energy harvesting cell may transfer the substation electrical power to one or more battery charger controllers. In some implementations, the one or more battery charger controllers may charge the one or more batteries.

In exemplary embodiments, one or more master power stations 210 may be communicatively coupled or connected to the one or more power sink substations 230 via one or more wireless communication links. This is to allow the one or more power sink substations 230 to provide feedback to the one or more master power stations 210 and/or also to instruct the one or more master power stations 210 when to activate or deactivate (or lessen the power of) the power laser module 220. As illustrated in FIG. 2A, two wireless communication links 250 and 255 may couple the one or more of the master power stations 210 to the one or more power sink substations 230. In some implementations, one wireless communication links (e.g., 250) may communicate a current measurement of the one or more power sink substations 230. In some implementations, the one or more power sink substations 230 may communicate a battery charge status parameter of the one or more batteries in the storage module 240 of one or more power sink substations 230 through communication link 255. In some implementations, the two communication links 250 and 255 listed below may be the same communication link but may be utilized at a different times.

In exemplary embodiments, the one or more master power stations 210 and the one or more sink power substations 230 may also include one or more wireless communication transceivers, wherein the computer-readable instructions are executable by one or more controllers or processors to monitor operational status of the one or more sink power substations 230 and to communicate instructions or commands to the one or more wireless communication transceivers in the sink power substations 230 to be transmitted to the wireless communication transceivers in the one or more master power stations 210 to control or adjust operation of the power laser devices in the one or more power laser modules 220 in the one or more master power substations 210. Described below are four different items, parameters or measurements that software executable by the one or more processors or controllers in the one or more sink power substations 230 may be monitoring in order to determine a power level for the power laser devices or whether or not the power laser modules 220 or devices need to be activated or deactivated.

In exemplary embodiments, the one or more sink power substations 230 may include a current monitor module 235. In some implementations, the current monitor module 235 may monitor current generated by the laser energy harvesting cell in the storage module 240. In some implementations, if the measured current is not within a specified range, the one or more controllers or processors in the sink power substations 230 may communicate laser power adjustment commands or instructions to the wireless communication transceiver in the sink power substations 230. In some implementations, the sink power substation 230 wireless communication transceiver may communicate the laser power adjustment commands or instructions to the wireless communication transceiver in the master power station 210 and the one or more processors or controllers in the master power station 230 may execute computer-readable instructions to communicate the laser power adjustment commands or instructions to the power laser module 220 in the master power station 210.

In addition, in many implementations, if there are a large number of people or even one person in a same indoor environment as the one or more sink power substations 230, it may not be safe to have the power laser emitting the plurality of power laser light beams to the one or more sink power substations 230. In these exemplary embodiments, the one or more sink power substations 230 may include a room occupancy sensor to determine a number of individuals in the indoor area including the one or more sink power substations 230. In some implementations, if the number of individuals calculated by the room occupancy sensor is greater than a predetermined threshold, the one or more controllers or processors in the sink power substations 230 may communicate laser power deactivation commands or instructions to the wireless communication transceiver in the sink power substations 230, which may communicate the laser power deactivation commands or instructions to the wireless communication transceivers in the one or more master power stations 210. In these exemplary embodiments, the one or more processors or controllers in the master power station 210 may execute computer-readable instructions to communicate the laser power activation or deactivation commands or instructions to the power laser module 220 in the master power station 210.

In addition, in order to maximize security around in the indoor environment with the one or more sink power substations 230, the laser power module in the master power stations 210 may not be activated during certain times of the day. As an illustrative example, the power laser power module (and the power laser) may not be activated from 7:00 am to 6:00 pm in order to maximize safety. In exemplary embodiments, the one or more controllers or processors in the master power station 210 or the sink power substation 230 may determine a time of day. In some implementation, if the determined time of day is during specified hours wherein individuals are located in an indoor area including the sink power substations 230, the one or more controllers or processors in the master power stations 210 may communicate commands or instructions to the power laser module 220 to ensure the power laser is not turned on or activated during the specified timeframe. In some implementations, the specified hours may be the working hours for a building or for a company with offices in the room or indoor area.

Another condition that the wireless optical power network system may look at is a battery charge status to determine if the one or more batteries in the one or more storage module 240 in the sink power substation are low in charge or are overcharged. In exemplary embodiments, the one or more storage modules 240 may include one or more batteries and/or one or more battery charger controllers. In exemplary embodiments, the one or more battery charger controllers may generate a battery charge status measurement for the one or more batteries. In exemplary embodiments, the one or more battery controllers or charger may transmit the generated battery charge status measurement to the one or more controllers or processors in the sink power substations 230. In some implementations, the computer-readable instructions executable by the one or more processors of the sink power substations 230 may determine if the generated battery charge status measurements are greater than a predetermined threshold, the one or more processors or controllers may communicate laser power adjustment, activation or deactivation commands or instructions to the wireless communication transceiver in the sink power substation 230. In exemplary embodiments, the wireless communication transceiver in the sink power substation 230 may utilize wireless link 255 to communicate the laser power deactivation, activation or adjustment commands or instructions to the wireless communication transceiver in the one or more master power stations 210. In these exemplary embodiments, the one or more processors or controllers in the master power station 210 may execute computer-readable instructions to communicate the laser power adjustment, activation or deactivation commands or instructions to the power laser module 220 in the master power station.

FIG. 2B illustrates a block diagram of a wireless optical power system or grid including one or more master power stations, one or more master power substations and one or more sink power substations according to exemplary embodiments. The main difference in the configuration of a wireless optical power system or grid 201 is the inclusion of one or more master power substations 260 in between the one or more master power stations 210 and/or the one or more sink power substations 280. In other words, the one or more master power stations 210 may be a) optically coupled to the one or more master power substations 260 and b) may also be communicatively connected or coupled to the one or more master power substations 260 via one or more wireless communication links 251 and/or 256. Further, the one or more master power substations 260 may be a) optically coupled to the one or more sink power substations 280 and/or b) may also be communicatively coupled to the one or more sink power substations 280 via wireless communication links 281 and 282. In some implementations, the one or more master power substations 260 may also provide power to a plurality of end user devices 277. Described below will be the interfaces that are different from FIG. 2A, i.e., the master power substation interfaces.

In exemplary embodiments as illustrated in FIG. 2B, the one or more master power stations 210 may be optically coupled to the one or more master substations 260. In exemplary embodiments, the one or more master power stations 210 may be communicatively coupled or connected to the one or more master power substations 260. In some implementations, the one or more power laser modules 220 may generate a plurality of power laser light beams and transmit these power laser light beams to the one or more storage modules 270 in the one or more master power substations 260. In exemplary embodiments, the one or more storage modules 270 may receive the power laser light beams and convert the one or more power laser light beams into electrical power, which may be referred to as master electrical power. In exemplary embodiments, the generated master electrical power may be utilized to provide power to a plurality of end user devices 277. In some implementations, the plurality of end user devices 277 may be coupled or connected to the one or more master power substations 260. In exemplary embodiments, the generated master electrical power may be transferred to one or more power laser modules 275 in the master power substation 260. In exemplary embodiments, the one or more power laser modules 275 may utilize the generated electrical power to generate and transmit a plurality of master power laser light beams. In exemplary embodiments, the one or more master power substations 260 may include a current monitor module 265. In some implementations, the current monitor module 265 may measure a current of the generated master electrical power. In some implementations, one or more processors in the master power substations 260 may execute computer-readable instructions to communicate the current measurement to one or more wireless communication transceivers in the master power substation 260. In some implementations, the wireless communication transceiver in the master power substation 260 may communicate the current measurement to the master power station 210 over wireless link 251 to allow the master power substation 260 to control the power emitted by the power laser module 220 in the master power station 210. In exemplary embodiments, the one or more storage modules 270 of the one or more master power substations 260 may include one or more batteries and one or more battery charge controllers. In some implementations, the one or more battery charge controllers may determine a battery charge measurement for the one or more batteries. In some implementations, one or more processors in the master power substation 260 may execute computer-readable instructions to communicate the battery charge measurement to one or more wireless communication transceivers in the master power substation 260. In some implementations, the wireless communication transceiver in the master power substation 260 may communicate the battery charge measurement to the master power station 210 over wireless link 256 to allow the master power station 210 to control or adjust the power emitted by the power laser in the power laser module 220 or to turn off or on the power laser.

In exemplary embodiments, the one or more master power substations 260 may include its own power laser module 275 or multiple power laser modules. In exemplary embodiments, the one or more storage modules 270 may be connected or coupled to the one or more power laser modules 275. In exemplary embodiments, the one or more power conversion modules in the one or more storage modules may convert the received power laser light beams into master electrical power and may transfer the received master electrical power to the one or more power laser modules 275. In exemplary embodiments, the one or more power laser modules 275 may be configured to or may generate a plurality of master power laser light beams.

In exemplary embodiments, the one or more additional sink power substations 280 may include one or more power storage modules 285, one or more battery charger controllers, a current monitor module 283, one or more batteries, one or more microprocessors, one or more memory devices, and computer-readable instructions stored on the one or more memory devices. In exemplary embodiments, the one or more power storage modules 280 may include a laser energy harvesting cell configured to receive the plurality of power laser light beams and convert the plurality of master power laser light beams (received from the power laser module 275 in the master power substation 260) into additional substation electrical power. In exemplary embodiments, the laser energy harvesting cell may transfer the additional substation electrical power to one or more battery charger controllers in the one or more sink power substations 280. In some implementations, the one or more battery charger controllers may charge the one or more batteries in the sink power substation storage module 285. In exemplary embodiments, the one or more batteries may provide power to a plurality of end user devices 290.

In exemplary embodiments, one or more master power substations 260 may be communicatively coupled or connected to the one or more additional power sink substations 280 via one or more wireless communication links 281 and 282. This is to allow the one or more additional sink power substations 280 to provide feedback to the one or more master power substations 260 and/or also to instruct the one or more master power substations 260 when to activate or deactivate the power laser module 275. As illustrated in FIG. 2B, two wireless communication links 281 and 282 communicatively couple the one or more of the master power substations 260 to the one or more power sink substations 280. In some implementations, one wireless communication links (e.g., 281) may communicate a current measurement of the one or more power sink substations 280. In some implementations, the one or more power sink substations 280 may communicate a battery charge status parameter of one or more batteries in the storage module 285 via wireless communication link 282 to the one or more master power substations 260. In some implementations, the two communication links 281 listed below may be the same communication link but utilized at a different time. In some implementations, the two communication links may be different communication links. In exemplary embodiments, one or more wireless communication transceivers in the sink power substation(s) 280 may communicate with one or more wireless communication transceivers in the master power substation(s) 260. The operations described previously regarding utilizing the current measurement and/or the battery charge status parameters with respect to the master power station 210 to control, adjust, activate or deactivate the power laser module apply here with respect to the power laser module 275 in the master power substation.

Figure 3:
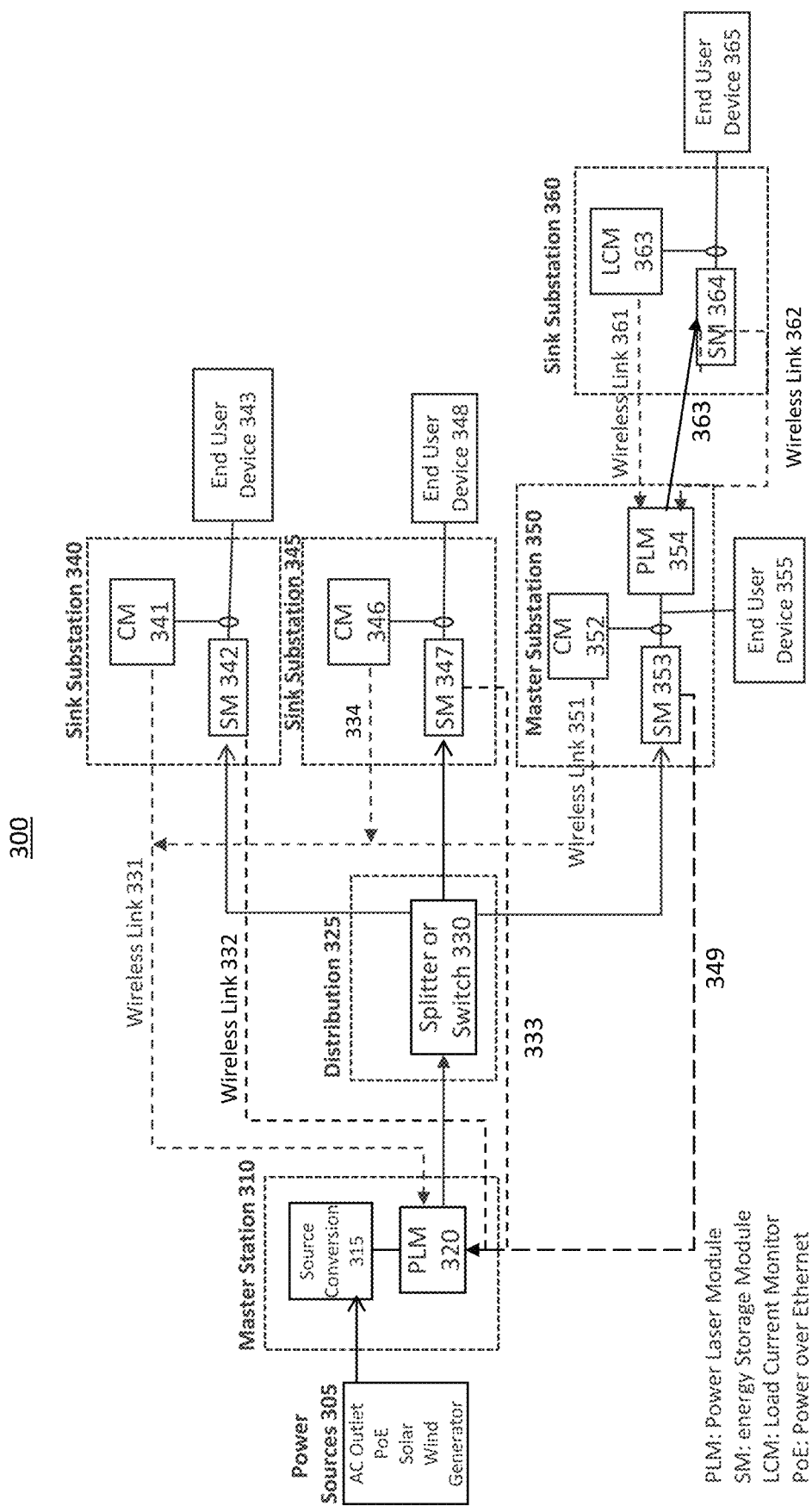
FIG. 3 illustrates a block diagram of a wireless optical power system or grid including an optical splitter and/or switch, one or more master power stations, one or more master power substations, and one or more sink power substations according to exemplary embodiments.

FIG. 3 illustrates a block diagram of a wireless optical power system or grid 300 including an optical splitter and/or switch, one or more master power stations, one or more master power substations, and one or more sink power substations according to exemplary embodiments. FIG. 3 includes aspects of FIG. 2A but includes two sink power substations 340 and 345 (instead of only one sink power substation as shown in FIG. 2A) and also aspects of FIG. 2B including a master power substation 350 and an additional sink power substation 360. In exemplary embodiments, the wireless optical power system or grid 300 includes one or more power sources 305, one or more master power stations 310, one or more optical distribution channels 325 (including one or more optical splitters or switches 330), one or more sink power substations 340 345, one or more master power substations 350, one or more additional sink power substations 360 and/or a plurality of end user devices 343 348 and 365 (although each of the plurality of end user devices 343 348 and 365 may represent a plurality of end user devices). A significant difference in FIG. 3 is that the one or more optical distribution channels 325 including the one or more optical splitters or switches 330 may distribute plurality of laser light beams generated by a power laser module 320 in a master power station 310 to multiple substations (e.g., sink power substation 340; sink power substation 345 and master power substation 350 in FIG. 3). This allows one master power station 310 to provide power (though the transmission of power laser light beams) to a plurality of devices.

In exemplary embodiments, one or more power sources 305 may be connected or coupled to one or more master power stations 310. As described above, the one or more power sources 305 may provide AC or DC power to the one or more master power stations 310. In some implementations, the one or more power sources 305 may be an AC outlet, power over Ethernet, one or more solar power devices, one or more wind power devices and/or an electrical generator. In exemplary embodiments, the one or more master power stations 310 may include a source or power conversion module or subsystem 315 and a power laser module 320. In exemplary embodiments, the master power station 310 may receive the power from the power sources 305 and the source conversion module or subsystem 315 may convert the received power into electrical power (e.g., AC electrical power or DC electrical power). In exemplary embodiments, the source conversion module or subsystem 315 may transfer the converted electrical power to the power laser module 320 and other systems or components of the master power station 310.

In exemplary embodiments, the power laser module 320 may utilize the electrical power and may generate a plurality of power laser light beams. In exemplary embodiments, the power laser module may be optically coupled to the optical distribution devices or subsystem 325 and the one or more optical splitters or switches 330. In exemplary embodiments, the power laser module 320 may transmit the plurality of laser light beams through an optical distribution channel to one or more optical splitters or switches 330 through an optical distribution device or channel 325 such as one or more optical fibres, one or more PVC pipes or tubes, one or more optical waveguides, or via free space optical links.

In exemplary embodiments, the one or more optical splitters or switches 330 may receive the plurality of power laser light beams from the power laser module 320 in the master power stations 310. In some implementations, the one or more optical splitters or switches 330 may be optically coupled or connected to a plurality of power substations. In some implementations, the one or more optical splitters or switches 330 may be optically coupled or connected to storage modules in the plurality of power substations. As shown in illustrative example FIG. 3, the one or more optical splitters or switches 330 may be optically coupled or connected to a storage module 342 in sink power substation 340, a storage module 347 in sink power substation 345 and/or a storage module 353 in master power substation 350. In some implementations, the one or more optical splitters or switches 330 may be optically coupled to other components in the plurality of substations. In exemplary embodiments, the one or more optical splitters or switches 330 may receive the plurality of power laser light beams and may split and distribute the plurality of power laser light beams through additional optical fibers, additional free space optical links, additional optical waveguides or additional PVC pipes or tubing to the plurality of power substations (e.g., the sink power substation 340, the sink power substation 345 and/or the master power substation 350). Although three substations are shown in FIG. 3, the one or more optical splitters or switches 330 may be optically coupled or connected to a smaller number or a larger number of power substations (e.g., 20, 50 or 1000 power substations).

As discussed previously with respect to FIGS. 2A and 2B, the plurality of power substations (e.g., the sink power substation 340, the sink power substation 345 and/or the master power substation 350) may be communicatively coupled or connected to the one or more master power stations 310. Specifically, as illustrated in FIG. 3, a) wireless communication link 331 may provide current measurements and/or power adjustment instructions or messages to the power laser module 320 in the master power station 310; b) wireless link 332 may provide activation or deactivation instructions or messages or battery charge measurements to the power laser module 320; c) wireless communication link 334 may provide current measurements and/or power adjustment instructions or messages to the power laser module 320 in the master power station 310; d) wireless clink 333 may provide activation or deactivation instructions or messages or battery charge measurements to the power laser module 320 (from the storage module 347); e) wireless communication link 351 may provide current measurements and/or power adjustment instructions or messages to the power laser module 320 in the master power station 310; and f) wireless link 349 may provide activation or deactivation instructions or messages or battery charge measurements to the power laser module 320 (from the storage module 353). These feedback mechanisms may operate in the same fashion as described above with respect to FIGS. 2A and 2B. Returning to FIG. 3, the master power substation 350 may operate in the same fashion as described above with respect to FIG. 2B. In exemplary embodiments, the master power substation 350 may be optically and/or communicatively coupled or connected to at least one additional sink power substation 360. The optical coupling or connection may be between the power laser module 354 in the master power substation 350 transmitting a plurality of power laser light beams to the storage module 364 in the power sink substation 360. In exemplary embodiments, the storage module 364 may convert the light energy into electrical energy and may provide power to a plurality of end user devices 365. In FIG. 3, in some implementations, the communicative coupling or connection will allow the current monitor module 363 to provide current measurements and power laser adjustment commands or instructions to the power laser module 354 over wireless communication link 361 and may also allow the storage module 364 to provide battery charge measurements and/or power laser activation or deactivation instructions or messages to the power laser module 354 in the master power substation 350 over wireless communication link 362. In exemplary embodiments, the wireless communication links will utilize one or more wireless communication transceivers in the sink power substation 360 communicating with one or more wireless communication transceivers in the master power substation 350.

Figure 4A:
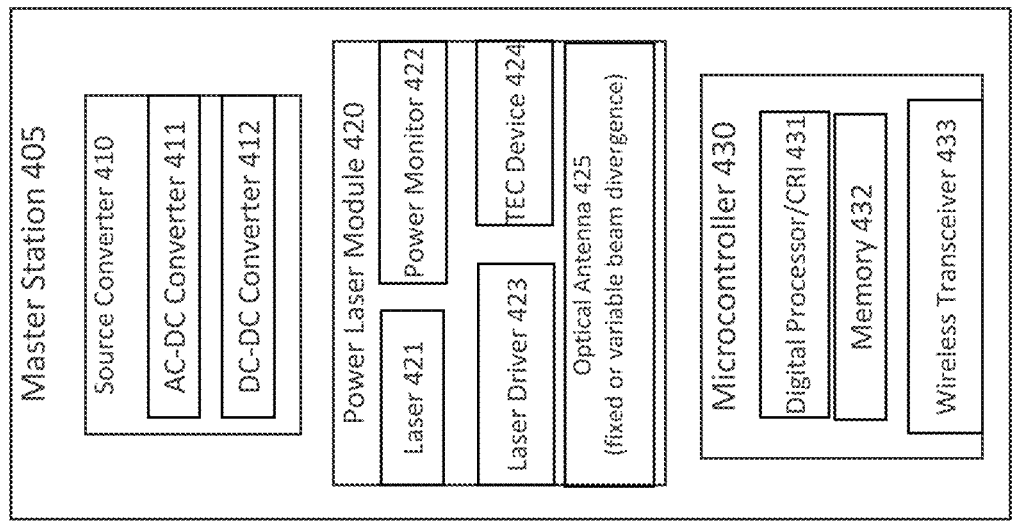
FIG. 4A illustrates block diagrams of a master power station according to exemplary embodiments.

FIG. 4A illustrates a block diagram of a master power station according to exemplary embodiments. In exemplary embodiments, a master power station 405 may include one or more power source converters 410, one or more power laser modules 420, and/or one or more microcontrollers 430. In exemplary embodiments, the power source converter 410 may include one or more AC-DC power converters 411 and/or one or more DC-DC power converters 412. In exemplary embodiments, the source converter 410 may receive power from external power sources as shown in FIGS. 2A, 2B and 3. In some implementations, the received power may be AC power and the AC-DC power converter 411 may convert the received AC power into DC power that can be utilized by the power laser module 420 and the microcontroller 430 and other components of the master power station 405. Note that in some implementations, the AC-DC power converter 411 may generate a plurality of DC voltages to meet requirements of the different subsystems and components of the master power station 405. In exemplary embodiments, the received power may be DC power and the DC-to-DC power converter 412 may convert the received DC power into usable DC power for the power laser module 420, the microcontroller 430 and/or other components of the master power substations 405. Note that in some implementations, the DC-DC power converter 412 may generate a plurality of DC voltages to meet requirements of the different subsystems and components of the master power station 405.

In exemplary embodiments, the source converter 410 may be coupled or connected to the power laser module 420. In exemplary embodiments, the power laser module 420 may include one or more power laser devices 421, one or more power monitor modules 422, one or more laser driver 423, one or more thermoelectric devices or resistive heaters 424 and/or one or more optical antennas 425. In some implementations, the master power station 405 may include multiple power laser modules. For example, one of the laser modules may be utilized for transmitting light beams including data while a first power laser module may be transmitting power laser light beams. This allows the transmission of data and power in an optical power grid system. Alternatively, the plurality of power laser modules may be transmitting power laser light beams that can be utilized for a power intensive system that it is connected to. In exemplary embodiments, the power laser module 420 may be optically coupled or connected to the optical antenna 425 (and may be communicatively coupled also). In exemplary embodiments, the optical antenna 425 may receive the plurality of laser light beams and may generate a fixed laser light beam or laser light beams with variable beam divergence. In some implementations, a fixed laser light beam may be utilized to allow the plurality of laser light beams to pass through small holes in areas like walls that would normally block laser light. In exemplary embodiments, the optical antenna 425 may be utilized (especially with free space optical links or optical waveguides).

In exemplary embodiments, the power laser module 420 may be coupled and/or connected to the one or more microcontrollers 430. In some embodiments, the one or more microcontrollers 430 may include one or more digital processors 431, one or more memory devices 432, computer-readable instructions stored in the one or more memory devices and executable by the one or more digital processors 431 or microcontrollers, and one or more wireless communication transceivers 433. In some implementations, the one or more wireless communication transceivers 433 may be located in the master power station but not inside the one or more microcontrollers 430. In exemplary embodiments, the computer-readable instructions may assist in controlling operations of the master power station 405 and/or the other systems and components of the master power station 405.

In exemplary embodiments, the laser driver 423 may be connected or coupled to the power laser 421 and may control operation of the power laser 421. In some implementations, the laser driver 421 may receive commands, instructions or messages from the one or more microcontrollers 430. In exemplary embodiments, the laser power monitor 422 may be coupled or connected to the power laser and may measure generated power by the power laser 421. In exemplary embodiments, the laser power monitor 422 may be coupled to the one or more microcontrollers 430 and may provide a laser power measurement to the one or more microcontrollers 430. In some implementations, software executable by the one or more microcontrollers 430 may determine whether the power measurement is within a specific range an if so, may cause the one or more microcontrollers to generate commands, instructions or signals to the laser driver 423 to adjust the power generated by the power laser 421. In exemplary embodiments, a temperature sensor (not shown) may measure a temperature of the power laser 421 and/or the laser driver 423. In some implementations, the temperature sensor may communicate the temperature measurement to the one or more microcontrollers 430. Computer-readable instructions executable by the one or more microcontrollers 430 may determine if the temperature measurement is too high and if so, may cause the one or more microcontrollers 430 to communicate commands, instructions or signals to thermoelectric device 424 to activate in order to cool the power laser 421. Alternatively, if the temperature measurement is too low, the computer-readable instructions may cause the one or more microcontrollers 420 to communicate commands, instructions or signals to resistive heaters in order to generate heat for the power laser 421.

Figure 4B:
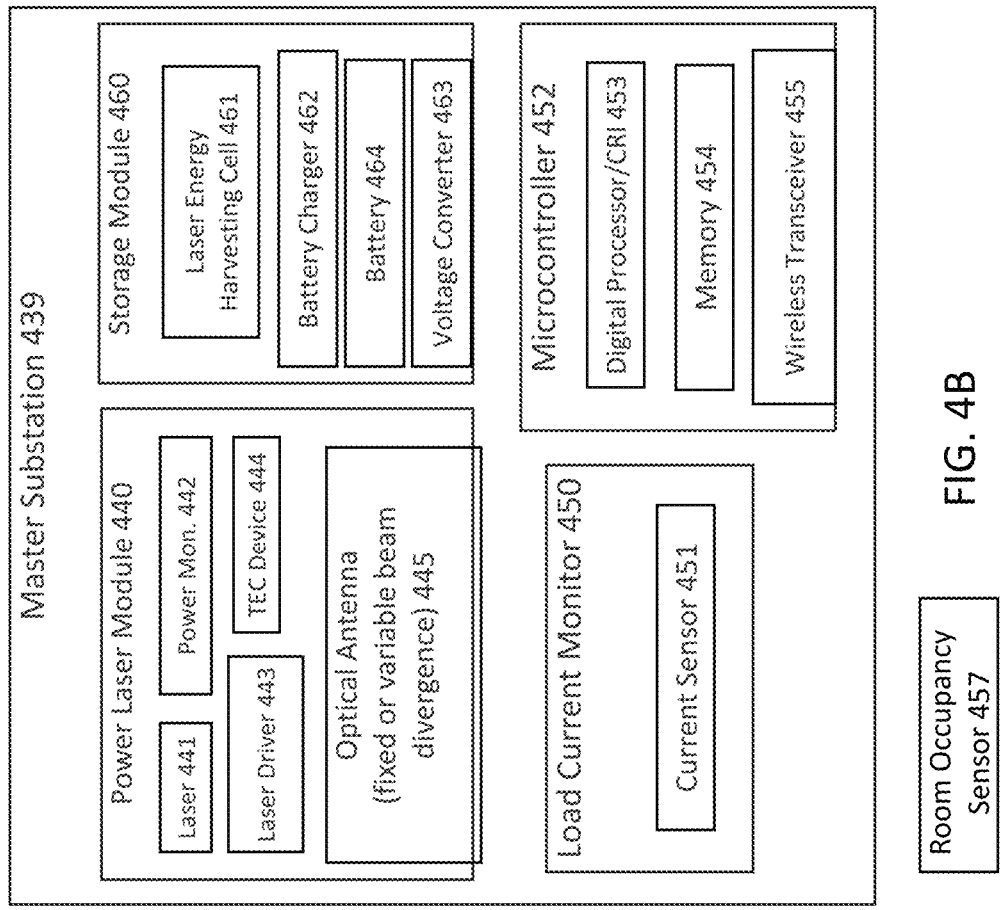
FIG. 4B is a block diagram of a master power substation according to exemplary embodiments.

FIG. 4B is a block diagram of a master power substation according to exemplary embodiments. As discussed above, the master power substation 439 may be optically coupled or connected and/or communicatively coupled or connected to the master power station 405 on an input side and may be optically coupled or connected and/or communicatively coupled to one or more sink power substations on an output side. In exemplary embodiments, the master power substation 439 may include one or more power laser modules 440, one or more current monitor modules 450, one or more storage modules 460 and/or one or more microcontrollers 452. In exemplary embodiments, the storage module 460 may include one or more laser energy harvesting cells 461, one or more battery charger controllers 462, one or more batteries 464 and/or one or more voltage converters 463. In some implementations, the laser energy harvesting cell 461 may be a resonant cavity photovoltaic cell to allow for efficient light to electrical energy conversion. In exemplary embodiments, the laser energy harvesting cell 461 may receive the plurality of power laser light beams from the power laser module 420 in the master power station 405 and may convert the light energy from the laser light beams into electrical energy and may output the electrical energy. In exemplary embodiments, the laser energy harvesting cell 461 may be coupled or connected to the one or more battery charger controllers 462. In exemplary embodiments, the one or more battery chargers or controllers 462 may receive the electrical energy generated by the laser energy harvesting cell. In exemplary embodiments, the one or more battery charger controllers 462 may be coupled or connected to the one or more batteries 464. In these embodiments, the one or more battery charger controllers 462 may provide electrical power to the one or more batteries to charge the batteries. In exemplary embodiments, the one or more battery charger controllers 462 or the one or more batteries 464 may be coupled or connected to one or more end user devices (not shown). In these embodiments, the one or more battery charger controllers 462 or the one or more batteries may supply electrical energy (e.g., voltage and current) to the end user devices. In exemplary embodiments, the one or more battery chargers 462 or the one or more batteries 464 may be connected or coupled to one or more voltage converters 462. In these embodiments, the one or more battery charger controllers 462 or the one or more batteries 464 may supply electrical energy to the one or more voltage converters 463 and the one or more voltage converters 463 may supply different DC voltages to different components and systems within the master power substation 440 or the one or more end user devices.

In exemplary embodiments, the one or more microcontrollers 452 in the master power substation 439, may include one or more digital processors 453, one or more memory devices 454, computer-readable instructions stored in the one or more memory devices and executable by the one or more microcontrollers or processors 452, and one or more wireless communication transceivers 455. In some implementations, the one or more wireless communication transceivers 455 may be located in the master power substation 439 but not in the one or more microcontrollers and processors 452. In exemplary embodiments, the one or more microcontrollers 452 may be communicatively coupled or connected to the one or more storage modules 460, the one or more power laser modules 440 and/or the one or more current monitor modules 450. The interaction and/or interface between the one or more microcontrollers 452 and the one or more power laser modules 440 is similar to the interaction and/or interface between the one described in FIG. 4A between the one or more microcontrollers 430 and one or more power laser modules 420 and will not be repeated here.

In exemplary embodiments, the current monitor module 450 may include one or more current sensors 451. In exemplary embodiments, the current monitor module 450 may be coupled or connected to the storage module 460. In some implementations, the one or more current sensors 451 may capture a current measurement for the electrical energy generated by the storage module 460. The one or more current sensors 451 may communicate or transfer the current measurement to the one or more microcontrollers 452. The computer-readable instructions executable by the one or more microcontrollers 452 may determine if the current measurement is too high or too low (e.g., is outside an acceptable range) and if so, the computer-readable instructions may cause the one or more microcontrollers 452 to generate power adjustment command(s), instruction(s) or signal(s) and communicate the generated power adjustment command(s), instruction(s) or signal(s) to the one or more wireless communication transceivers 455. In these implementations, the one or more wireless communication transceivers 455 may communicate the received generated power adjustment command(s), instruction(s) or signal(s) to wireless communication transceivers 433 in the master power station 405 where these command(s), instruction(s) or signal(s) are sent to the power laser module 420 to adjust power of the power laser 421.

In exemplary embodiments, the master power substation 439 or an environment (e.g., a structure or room or building) including the master power substation 439, may include a room or structure occupancy sensor 457. In some implementations, the room or structure occupancy sensor 457 may be communicatively coupled or connected to one or more microcontrollers 452. In exemplary embodiments, the room occupancy sensor 457 may determine if there are individuals in the room or structure or may determine a number of individuals in the room or structure. In exemplary embodiments, the room or structure occupancy sensor 457 may communicate that there are no individuals or a number of individuals to the one or more microcontrollers 452. In these implementations, computer-readable instructions executable by the one or more microcontrollers 452 may receive this information and in some circumstances, if there are individuals in the room, the computer-readable instructions may cause the one or more microcontrollers 452 to communicate deactivation commands, instructions or signals to the wireless communication transceiver 455. In these implementations, the wireless communication transceiver 455 in the master power substation 439 may communicate with the wireless communication transceiver 433 in the master power station 405 to send this deactivation commands, instructions or signals to the power laser module 420. In other words, if there are individuals in the room, then the power laser module 420 may be deactivated to turn off the power laser in the master power station 405 due to potential safety issues. In some implementations, there may be a number of individuals who are in the room that may be problematic (e.g., three or more) and in these circumstances, the computer-readable instructions may cause the microcontroller 452 to send deactivation commands, instructions or signals to deactivate the laser once this threshold number is met. In these implementations, computer-readable instructions executable by the one or more microcontrollers 452 may receive this information and in some circumstances, if there are no individuals in the room, cause the one or more microcontrollers 452 to communicate activation commands, instructions or signals to the wireless communication transceiver 455. In these implementations, the wireless communication transceiver 455 in the master power substation 440 may communicate with the wireless communication transceiver 433 in the master power station 405 to send this activation commands, instructions or signals to the power laser module 420. In other words, if there are no individuals in the room, then the power laser module 420 may be activated to turn on the power laser.

In exemplary embodiments, the one or more battery charger controllers 462 may measure charge status of the one or more batteries 464 in the master power substation 439. In exemplary embodiments, the one or more battery charger controllers 462 may communicate the battery charge status measurement to the one or more microcontrollers 452. In exemplary embodiments, computer-readable instructions executable by the one or more microcontrollers 452 may determine if the battery charge status measurement is too low and may cause the one or more microcontrollers 452 to communicate activation commands, instructions or signals to the wireless communication transceiver 455 in the master power substation 439. If alternative embodiments, if the computer-readable instructions determine that the battery charge status measurement is too high, the one or more microcontrollers 452 may communicate deactivation commands, instructions or signals to the wireless communication transceiver 455 in the master power substation. In exemplary embodiments, the wireless communication transceiver 455 in the master power substation 439 may communicate the deactivation or the activation commands, instructions or signal to the wireless communication transceiver 433 in the master power substation 405 in order to activate and/or deactivate the power laser 421 in the power laser module of the master power station 405.

In exemplary embodiments, a power laser may be turned off during specific times of the day. For example, if the room or structure receiving the power is normally occupied by individuals from 8 am to 6 pm Monday through Friday, the power laser module 440 in the master power substation may know not to supply any optical power to the master power substations or to the sink power substations during that timeframe in order to maintain a safe environment. If it is after 6 pm and before 8 am on a weekday or if it is a weekend, then the system may allow optical power to be transferred to the master power substation or the sink power substation. As an illustrative example, computer-readable instructions executable by the one or more microcontrollers 452 in the master power substation 439 may determine a time of day by communicating with a clock or timing instrument in the master power substation 439. If the determined or measured time is during working hours, the one or more microcontrollers 452 may communicate deactivation commands, instructions or signals to the power laser module 440 in the master power substation to make sure the power laser 441 does not turn on. Also, the one or more microcontrollers may communicate deactivation commands, instructions or signals to the one or more wireless communication transceiver 455 which in turn may communicate the deactivation commands, instructions or signals to the one or more wireless communication transceiver 433 in the master power station 405 so that the power laser module 420 in the master power station 405 is also turned off and not transmitting a plurality of power laser light beams. In some implementations, if the determined or measured time is outside working hours or during a weekend, the one or more microcontrollers 452 may communicate activation commands, instructions or signals to the power laser module 420 in the master power station 405 to turn on the power laser 421 and start communicating a plurality of power laser light beams to the master power substation 439.

Figure 4C:
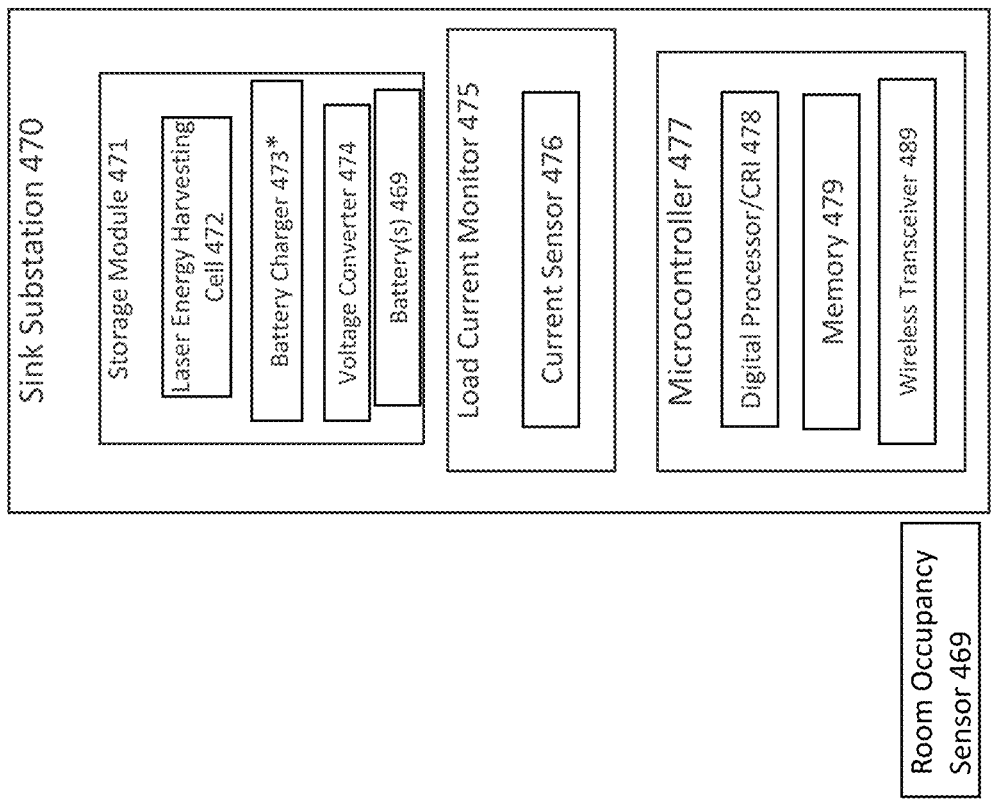
FIG. 4C is a block diagram of a sink power substation according to exemplary embodiments.

FIG. 4C is a block diagram of a sink power substation according to exemplary embodiments. As discussed above, the sink power substation 470 may be optically coupled or connected and/or communicatively coupled or connected to a master power station 405 or a master power substation 439 on an input side and may be connected or coupled to one or more end user devices on an output side. In exemplary embodiments, the sink power substation 470 may include a current monitor module 475, a storage module 471 and/or one or more microcontrollers 477. In exemplary embodiments, the storage module 471 includes a laser energy harvesting cell 472, one or more battery charger controllers 473, one or more batteries 469 and/or one or more voltage converters 474. In some implementations, the laser energy harvesting cell 472 may be a resonant cavity photovoltaic cell to allow for efficient light to electrical energy conversion. In exemplary embodiments, the laser energy harvesting cell 472 may receive the plurality of power laser light beams from the power laser module 440 in the master power substation 439 or the power laser module 420 in the master power station 405, convert the light energy from the laser light beams into electrical energy, and output the electrical energy. In exemplary embodiments, the laser energy harvesting cell 472 may be coupled or connected to the one or more battery charger controllers 473. In exemplary embodiments, the one or more battery charger controllers 473 may receive the electrical energy generated by the laser energy harvesting cell 472. In exemplary embodiments, the one or more battery charger controllers 473 may be coupled or connected to the one or more batteries 469. In these embodiments, the one or more battery charger controllers 473 may provide electrical power to the one or more batteries 469 to charge the one or more batteries. In exemplary embodiments, the one or more battery charger controllers 473 or the one or more batteries 469 may be coupled or connected to one or more end user devices (not shown). In these embodiments, the one or more battery charger controllers 473 may supply electrical energy (e.g., voltage and current) to the end user devices. In exemplary embodiments, the one or more battery charger controllers 473 and/or the one or more batteries may be connected or coupled to one or more voltage converters 474. In these embodiments, the one or more battery charger controllers 473 or the one or more batteries 469 may supply electrical energy to the one or more voltage converters 474 and the one or more voltage converters 474 may supply different DC voltages to different components and systems within the sink power substation 470 and/or to a plurality of end user devices.

In exemplary embodiments, the one or more microcontrollers 477 in the sink power substation 470, may include one or more digital processors 478, one or more memory devices 479, computer-readable instructions stored in the one or more memory devices 479 and executable by the one or more microcontrollers or processors, and one or more wireless communication transceivers 489. In some implementations, the one or more wireless communication transceivers 489 may be located in the sink power substation 479 but not in the one or more microcontrollers and processors 477. In exemplary embodiments, the one or more microcontrollers 477 may be communicatively coupled or connected to the one or more storage modules 471 and/or one or more current monitor modules 475.

In exemplary embodiments, the current monitor module 475 in the sink power substation 470 may include one or more current sensors 476. In exemplary embodiments, the current monitor module 470 may be coupled or connected to the storage module 471. In some implementations, the current sensor 476 may capture a current measurement for the electrical energy generated by the storage module 471. The current sensor 476 may communicate or transfer the current measurement to the one or more microcontrollers 477. The computer-readable instructions executable by the one or more microcontrollers 477 may determine if the current measurement is too high or too low (e.g., is outside an acceptable range) and if so, the computer-readable instructions may cause the one or more microcontrollers 477 to generate power adjustment command(s), instruction(s) or signal(s) and communicate the generated power adjustment command(s), instruction(s) or signal(s) to the one or more wireless communication transceivers 489. In these implementations, the one or more wireless communication transceivers 489 may communicate the received generated power adjustment command(s), instruction(s) or signal(s) to wireless communication transceivers 455 in the master power substation 439 where these command(s), instruction(s) or signal(s) are sent to the power laser module 440 to adjust power of the power laser 441. Similarly, commands may be communicated to wireless communication transceivers 433 in the master power station 405 where these command(s), instruction(s) or signal(s) are sent to the a power laser module 420 in a master power station 405 if the sink power substation is connected to a master power station rather than master power substation.

In exemplary embodiments, the sink power substation 470 or an environment (e.g., a structure or room or building) including the sink power substation, may include a room or structure occupancy sensor 469. In some implementations, the room or structure occupancy sensor 469 may be communicatively coupled or connected to one or more microcontrollers 477. In exemplary embodiments, the room occupancy sensor 469 may determine if there are individuals in the room or structure or may determine a number of individuals in the room or structure. In exemplary embodiments, the room or structure occupancy sensor 469 in the sink power substation may communicate that there are no individuals or may communicate a number of individuals to the one or more microcontrollers 477. In these implementations, computer-readable instructions executable by the one or more microcontrollers 477 may receive this information and in some circumstances, if there are individuals in the room, the computer-readable instructions may cause the one or more microcontrollers 477 to communicate deactivation commands, instructions or signals to the wireless communication transceiver 489. In these implementations, the wireless communication transceiver 489 in the sink power substation 470 may communicate with the wireless communication transceiver 455 in the master power substation 439 to send this deactivation command, instruction or signal to the power laser module 440. In other words, if there are individuals in the room, then the power laser module 440 in the master power substation 439 may be deactivated to turn off the power laser 441 due to potential safety issues. In some implementations, there may be a number of individuals who are in the room that may be problematic (e.g., three or more) and in these circumstances, the computer-readable instructions may cause the microcontroller 477 to send deactivation commands, instructions or signals to deactivate the power laser 441 once this threshold is met. In these implementations, computer-readable instructions executable by the one or more microcontrollers 477 may receive this information and in some circumstances, if there are no individuals in the room, cause the one or more microcontrollers 477 to communicate an activation command, instruction or signal to the wireless communication transceiver 489. In these implementations, the wireless communication transceiver 489 in the sink power substation 470 may communicate with the wireless communication transceiver 455 in the master power substation 439 to send this activation command, instruction or signal to the power laser module 440. In other words, if there are no individuals in the room, then the power laser module 440 may be activated to turn on the power laser 441. As noted before, these instructions may also be sent to power laser modules 420 in the master power station 405 (via its wireless communication transceivers) if that is the device the sink power substation 470 is connected to.

In exemplary embodiments, the one or more battery charger controllers 473 may measure charge status of the one or more batteries in the sink power substation 470. In exemplary embodiments, the one or more battery charger controllers 473 may communicate the battery charge status measurement to the one or more microcontrollers 477. In exemplary embodiments, computer-readable instructions executable by the one or more microcontrollers 477 may determine if the battery charge status measurement is too low and may cause the one or more microcontrollers 477 to communicate activation commands, instructions or signals to the wireless communication transceiver 455 in the master power substation 439 or the wireless communication transceiver 433 in the master power station 405. In alternative embodiments, if the computer-readable instructions determine that the battery charge status measurement is too high, the one or more microcontrollers 477 may communicate deactivation commands, instructions or signals to the wireless communication transceiver 489 in the sink power substation 470. In exemplary embodiments, the wireless communication transceiver 489 in the sink power substation 470 may communicate the deactivation or the activation commands, instructions or signal to the wireless communication transceiver 433 in the master power substation 405 or the wireless communication transceiver 455 in the master power substation 439 in order to activate and/or deactivate the power laser 441 in the power laser module 440 of the master power substation 439 (or the associated power laser module 420 in the master power station 405). In exemplary embodiments, the actions described immediately above with respect to the communication interface between the sink power substation and the master power substation may also take place between the sink power substation and the master power station. In addition, depending upon a time of day, the one or more microcontrollers 477 may communicate deactivation or activation commands, instructions or signals to the wireless communication transceiver 489, which will in turn communicate deactivation or activation commands, instructions or signals to the wireless communication transceiver 433 in the master power station 405 or the wireless communication transceiver 455 in the master power substation 439 in order to activate or deactivate the power laser 420 of the master power station 405 or the power laser module 440 of the master power substation 439.

Figure 4E:
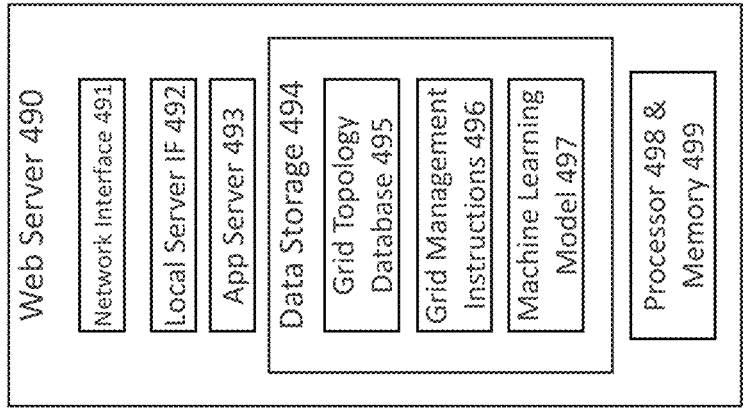
FIG. 4E illustrates a web server computing device according to exemplary embodiments.
Figure 4D:
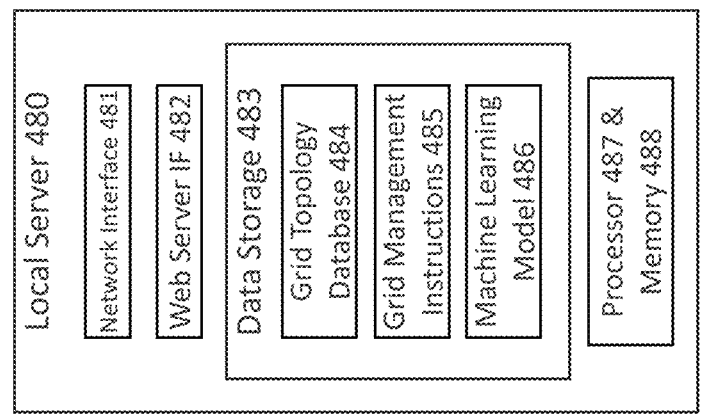
FIG. 4D illustrates a local server computing device according to exemplary embodiments.

FIG. 4D illustrates a local server computing device according to exemplary embodiments. In exemplary embodiments, the local server computing device 480 may be communicatively coupled to one or more master power stations 405, one or more master power substations 439, one or more sink power substations 470, one or more power sources, one or more optical distribution devices, and/or one or more web server computing devices 482. In exemplary embodiments, the local server computing device 480 may include local network interface 481, web server network interface 482, one or more data storage devices 483, one or more processors or controllers 487 and one or more memory devices 488. In exemplary embodiments, the local server computing device 480 may utilize the one or more local network interfaces 481 to communicate with the one or more master power stations 405, one or more master power substations 439, one or more sink power substations 470, one or more power sources, and/or one or more optical distribution devices. In some implementations, the local network interface 481 may utilize LAN wireless communication protocols such as WiFi or 802.11 wireless protocols or personal area network (PAN) wireless communication protocols to communicate with these power generating or distribution devices. In some implementations, the local area network interface may be a low power wireless communication such as Matter or Thread. In exemplary embodiments, the local server computing device 480 may be communicatively coupled to the web server computing device 482 via a global communications network such as an Ethernet network and may utilize communication protocols such as TCP, UDP, IP, HTTP, IRC, BGP and ARP. In exemplary embodiments, the one or more processors 482 may execute computer-readable instructions stored in the one or more memory devices 488 to control operations of the local server computing device 480 and/or to communicate with the power generating or power distribution devices mentioned above. In exemplary embodiments, the one or more data storage computing devices 483 may also include an optical power grid topology database 484, optical power grid management computer-readable instructions 485 and/or a machine learning model 486. In exemplary embodiments, the optical power grid topology database 484 may contain device information, parameters, operating conditions, location, and/or performance statistics for the power sources, the master power stations, the optical distribution links or devices, the master power substations, and/or the sink power substations under control or in an area of the local server computing device 480. In exemplary embodiments, the one or more processors or controllers 487 may execute the optical power grid management computer-readable instructions to communicate commands, instructions or signals to the power generation and distribution devices or stations in the optical power network. As illustrative examples, these optical power grid management instructions, commands or signals may request operating conditions an performance statistics of these different stations or devices, may request deactivation or activation of power laser modules, and/or may request that a power of the laser device be adjusted. In exemplary embodiments, the local server computing device 480 may receive the performance statistics or operation conditions of the optical power generation and distribution devices and may store this information in the optical power grid topology database 484. In exemplary embodiments, computer-readable instructions executed by the one or more processors or controllers 487 may utilize the machine learning model 486 and analyze the information in the grid topology database 484 to understand trends and/or characteristics of the wireless optical power grid network and/or also to predict future performance statistics and operating conditions of the power sources, the master power stations, the optical distribution links or devices, the master power substations, and/or the sink power substations in order to help the owner or user of the optical power grid network to maintain peak and/or efficient performance. The local server computing device 480 may handle this for all nodes, systems or stations in its area or network.

FIG. 4E illustrates a web server computing device according to exemplary embodiments. In exemplary embodiments, the web server computing device 490 may be communicatively coupled to one or more local server computing devices 480 and may also be communicatively coupled or connected to one or more power stations 405, one or more master power substations 439, one or more sink power substations 470, one or more power sources, one or more optical distribution devices, and/or one or more additional web server computing devices 490. In exemplary embodiments, the web server computing device 490 may include a global communications network interface 491, a local server network interface 492, an app server or an app server computing device 493, one or more data storage devices 494, one or more processors or controllers 498 and one or more memory devices 499. In exemplary embodiments, the web server computing device 490 may utilize the one or more global network interfaces 491 to communicate with the one or more local server computing devices 480 (or other web server computing devices) and/or may also use the global network interface 491 to communicate with the one or more master power stations 405, one or more master power substations 439, one or more sink power substations 470, one or more power sources, and/or one or more optical distribution devices. In exemplary embodiments, the web server computing device 490 may communicate with the local server computing devices via a local server interface 492. In some implementations, the web server computing device 490 may communicate via a global communications network such as Ethernet network and may utilize communication protocols such as TCP, UDP, IP, HTTP, IRC, BGP and ARP. In exemplary embodiments, the one or more processors 498 may execute computer-readable instructions stored in the one or more memory devices 499 to control operations of the web server computing device 490, the one or more local server computing devices 480 and/or to communicate with the power generating or distribution devices mentioned above. In exemplary embodiments, the one or more data storage computing devices 494 may also include an optical power grid topology database 495, optical power grid management computer-readable instructions 496 and/or a machine learning model 497.

In exemplary embodiments, the optical power grid topology database 495 may contain device information, parameters, operating conditions, location, and/or performance statistics for the power sources, the master power stations, the optical distribution links or devices, the master power substations, and/or the sink power substations under control or in an area of all of the local server computing devices 480 that are communicating with or under the control of the web server computing device 490. In exemplary embodiments, the one or more processors or controllers 498 may execute the optical power grid management computer-readable instructions 496 to communicate commands, instructions or signals to the one or more local server computing devices 480 as well as power generation and distribution devices or stations in the wireless optical power network. These optical power grid management instructions, commands or signals may request operating conditions an performance statistics of these different stations or devices, may request network operating conditions and performance statistics for all devices in a local server computing device 480's network, may request deactivation or activation of power laser modules throughout the optical power grid, and/or may request that a power of the laser devices be adjusted throughout the optical power grid. In exemplary embodiments, the web server computing device 490 may receive the performance statistics or operation conditions of the one or more local area networks associated with the local server computing device 480, the one or more optical power generating and distribution devices and may store this information in the optical power grid topology database 495. In exemplary embodiments, computer-readable instructions executed by the one or more processors or controllers 498 may utilize the machine learning model 497 and analyze the information in the grid topology database 495 to understand trends and/or characteristics of the optical power grid network and/or also to predict future performance statistics and operating conditions of the one or more optical grid networks associated with the one or more local server computing devices; the power sources, the master power stations, the optical distribution links or devices, the master power substations, and/or the sink power substations in order to help the owner or user of the optical power grid network to maintain peak and/or efficient performance. The web server computing device may handle this for all nodes, systems or stations that are under the control and/or in communication with the web server computing device. In exemplary embodiments, the app server 493 may allow users, operators or owners to login to or to interface with the web server computing device 490. The app server 493 may allow these users, operators or owners to review the operating conditions, the performance statistics, the configurations and/or data received from all the components, systems, stations, local networks or nodes which are under the control of or in communication with the web server computing device 490.

In exemplary embodiments, a wireless optical power network for power distribution and charging of a plurality of devices, comprising a power source to generate electrical power; one or more master power stations coupled or connected to the power source, the one or more master power stations configured to receive the electrical power and to generate a plurality of power laser light beams based at least in part on the electrical power; one or more optical distribution devices coupled or connected to the one or more master power stations, the one or more optical distribution devices to receive the plurality of laser light beams and the one or more optical distribution devices including an optical splitter or switching device; the optical splitter or switching device to divide the plurality of laser light beams into a first plurality of power laser light beams, a second plurality of power laser light beams, and a third plurality of power laser light beams; a first sink power substation optically coupled to the optical splitter or switching device, the first sink power substations configured to receive the first plurality of power laser light beams via the optical splitter or switching device, to convert the first plurality of power laser light beams to first sink substation electrical power and to transfer the first substation electrical power; a second sink power substation optically coupled to the optical splitter or switching device, the second sink power substations configured to receive the second plurality of power laser light beams via the optical splitter or switching device, to convert the second plurality of power laser light beams to second sink substation electrical power and to transfer the first substation electrical power; and a first end user device to receive the first sink substation electrical power in order to charge the first end user device; and a second end user device to receive the second substation electrical power in order to charge the second end user device.

In exemplary embodiments, the wireless optical power network may also include a master power substation optically coupled to the optical splitter or switching device, the master power substation configured to receive the third plurality of power laser light beams via the optical splitter or switching device, to convert the third plurality of power laser light beams to master substation electrical power and to transfer the master substation electrical power; and a third end user device to receive the master substation electrical power in order to charge the third end user device. In exemplary embodiments, the master power substation may include a master power laser module, the master power laser module configured to receive the master substation electrical power and to generate a plurality of master power laser light beams based at least in part on the electrical power; and a third sink power substation optically coupled to the master power substation, the third sink power substation configured to receive the plurality of master power laser light beams, to convert the plurality of master power laser light beams to third sink substation electrical power and to transfer the third sink substation electrical power to a fourth end user device.

In exemplary embodiments, the one or more optical distribution devices may include a beam expander to expand a width of the plurality of power laser light beams for eye safety of users in an environment where the wireless optical power network is utilized. In exemplary embodiments, the one or more optical distribution devices may include a beam condenser to narrow a width of the plurality of power laser light beams to allow the plurality of power laser light beams to pass through small diameter holes in obstacles. In exemplary embodiments, the one or more optical distribution devices may be an optical fiber, a multi-core optical fibre, an optical waveguide, a PVC pipe or tubing or a free space optical channel and the optical fiber is located in a PVC pipe. In exemplary embodiments, the optical distribution device may be a PVC pipe and the PVC pipe includes a first straight section, an elbow section and a second straight section wherein the elbow section allows routing of the plurality of power laser light beams around corners in an environment by passing through the first straight section, the elbow section and the second straight section. In exemplary embodiments, if the optical distribution device is the PVC pipe, and the PVC pipe is a vacuum controlled environment or the PVC pipe is filled with an inert gas to minimize attenuation of the plurality of power laser light beams travelling through the PVC pipe.

In exemplary embodiments, the power source may be an alternating current (AC) power source and the AC power source may be an AC outlet or a generator. In exemplary embodiments, the power source may be a direct current (DC) power source. In exemplary embodiments, the DC power source may be a Power over Ethernet (POE) device; one or more solar panels and one or more batteries; one or more batteries; or one or more wind turbines and one or more batteries.

In exemplary embodiments, the power conversion module of the master power station may include a DC-to-DC power converter module and an AC-to-DC power converter module, wherein the power conversion module configured to receive the electrical power from the power source and if the received electrical power is DC power, the DC-to-DC power converter module to convert the DC power to a DC power compatible with a power laser module or if the received electrical power is AC power, the AC-to-DC power converter module to convert the AC power to a DC electrical power compatible with the power laser module.

In exemplary embodiments, the power laser module of the one or more master power stations may include a power laser, a power laser driver, a power monitor or controller, wherein the power laser driver may be configured to receive instructions or signals from external devices, to receive the electrical power from the AC-to-DC power converter module or the DC-to-DC power converter module, and to communicate driver signals or commands to the power laser which emits or transmits the plurality of power laser light beams. In exemplary embodiments, if the received instructions or signals are to deactivate the power laser, the power laser driver may be configured to communicate a deactivation signal or command to turn off the power laser device. In exemplary embodiments, the power laser module may include an optical antenna, the optical antenna configured to optically couple the plurality of power laser light beams to one or more free-space optical channels. In exemplary embodiments, the power laser module may include an optical mounting and alignment device, one or more digital signal processors, one or more memory devices, and/or computer-readable instructions stored in the one or more memory devices, the computer-readable instructions executable by the one or more digital signal processors to receive laser beam alignment parameters and if the alignment parameters identify that the plurality of power laser beams are out of alignment, transmitting a signal to the optical mounting and alignment device to change an orientation or position of the transmitted plurality of power laser light beams. In exemplary embodiments, the master power station may include a power storage module, the power storage module including one or more batteries and a battery charger controller, wherein the electrical power from the power source is supplied to the battery charger controller that is configured to charge the one or more batteries in order to provide a backup for the master power station in case of power loss.

In exemplary embodiments, the optical power network may include one or more switching devices, the one or more switching devices coupled to an associated one or more sink power substations, the one or more switching devices configured to receive signals or commands to disconnect or connect the one or more sink power substations from either the plurality of end user devices or the master power station in order to isolate the plurality of end user devices or the master power station from the one or more sink power substations. In exemplary embodiments, the wireless optical power network may include one or more inverters, the one or more inverters to receive electrical power from the one or more battery charger controllers or the one or more batteries and to convert the received electrical power to alternating current (AC) power to supply to a plurality of end user devices that require AC power. In exemplary embodiments, the wireless optical power network may include one or more DC voltage converters, the one or more DC voltage converters to receive electrical power from the one or more battery charger controllers or the one or more batteries and to convert the received electrical power to a direct current (DC) voltage compatible with one or more of the plurality of end-user devices. In exemplary embodiments, the wireless optical power network may include one or more supercapacitors, the one or more supercapacitors coupled or connected to the one or more batteries, the one or more batteries to supply electrical power to the one or more supercapacitors, where the one or more supercapacitors supply electrical power to rapid energy intensive operations such as industrial machinery, transportation and energy harvesting.

In exemplary embodiments, a power laser module may include an optical antenna, the optical antenna configured to optically couple the plurality of power laser light beams to one or more free-space optical channels. In exemplary embodiments, the power laser module may include an optical mounting and alignment device, one or more digital signal processors, one or more memory devices, and/or computer-readable instructions stored in the one or more memory devices, the computer-readable instructions executable by the one or more digital signal processors to receive laser beam alignment parameters and if the alignment parameters identify that the plurality of power laser beams are out of alignment, transmitting a signal to the optical mounting and alignment device to change an orientation or position of the transmitted plurality of power laser light beams. In exemplary embodiments, the wireless optical power network may include one or more switching devices, the one or more switching devices coupled to an associated one or more master power substations, the one or more switching devices configured to receive signals or commands to disconnect or connect the one or more master power substations from either the plurality of end user devices or the master power station in order to isolate the plurality of end user devices or the master power station from the one or more master power substations. In exemplary embodiments, the optical power wireless network may include one or more inverters, the one or more inverters to receive electrical power from the one or more battery chargers or the one or more batteries and to convert the received electrical power to alternating current (AC) power to supply to the plurality of end user devices that require AC power. In exemplary embodiments, the optical power wireless network may include one or more DC voltage converters, the one or more DC voltage converters to receive electrical power from the one or more battery chargers or the one or more batteries and to convert the received electrical power to a direct current (DC) voltage compatible with one or more of the plurality of end-user devices.

In exemplary embodiments, the local server computing device may include computer-readable instructions executed by the one or more processors or controllers may utilize the machine learning model and analyze the information in the grid topology database to understand trends and/or characteristics of the optical power grid network and/or also to predict future performance statistics and operating conditions of the power sources, the master power stations, the optical distribution links or devices, the master power substations, and/or the sink power substations under control or in communication with the local server computing device. In exemplary embodiments, a web server computing device, the web server computing device may include a global network interface, a local server computing device interface, an app server, one or more data storage devices, one or more processors, one or more memory devices, and computer-readable instructions executable by the one or more processors to control operation of the web server computing device; and wherein the one or more data storage devices includes an optical power grid topology database, optical power grid management computer-readable instructions and a machine learning module.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. A wireless optical power network for power distribution and charging of a plurality of devices, comprising:
    a power source to generate electrical power;
    one or more master power stations coupled or connected to the power source, the one or more master power stations configured to receive the electrical power and to generate a plurality of power laser light beams based at least in part on the electrical power;
    one or more optical distribution devices coupled or connected to the one or more master power stations, the one or more optical distribution devices to receive the plurality of power laser light beams;
    one or more sink power substations optically coupled to the one or more optical distribution devices, the one or more sink power substations configured to receive the plurality of power laser light beams via the one or more optical distribution devices, to convert the plurality of power laser light beams to substation electrical power and to transfer the substation electrical power;
    a plurality of end user devices to receive the substation electrical power in order to charge the plurality of end user devices, the plurality of end user devices including one or more cameras and one or more sensors; and
    a local network server computing device, the local network server computing device including one or more processors or controllers, one or more memory devices, and computer-readable instructions stored on the one or more memory devices, the computer-readable instructions executable by the one or more processors or controllers to receive commands or signals identifying operational parameters or status parameters of the one or more master power stations, the one or more optical distribution devices, the one or more sink power substations or the plurality of end user devices,
    the local network server computing device further including a local network interface, a web server interface, and one or more data storage devices, the computer-readable instructions executable by the one or more processors to control operations of the local network server computing device, and
    the one or more data storage devices to include an optical power grid topology database, optical power grid management computer-readable instructions and a machine learning module, the optical power grid topology database including device information, parameters, operating conditions, location, and/or performance statistics for the power source, the one or more master power stations, the one or more optical distribution devices, and/or the one or more sink power substations under control or in an area of the local network server computing device.

2. The wireless optical power network of claim 1, wherein the power source includes at least one of an alternating current (AC) power outlet, a Power over Ethernet (POE) device, one or more solar cells, one or more wind generators, or an electrical generator.

3. The wireless optical power network of claim 1, the one or more master power stations including a power conversion module and a power laser module, the power conversion module configured to receive the electrical power from the power source and to transfer the received electrical power to the power laser module, the power laser module configured to generate the plurality of power laser light beams.

4. The wireless optical power network of claim 1, wherein the one or more optical distribution devices includes at least one of one or more free space optical channels, one or more PVC (polyvinal chloride) pipes or other pipes or tubing, one or more waveguides, or one or more optical fibres to receive the plurality of power laser light beams.

5. The wireless optical power network of claim 1, the one or more sink power substations to include a power storage module, a battery charger controller, one or more batteries, and a current monitor module, wherein the power storage module includes a laser energy harvesting cell configured to receive the plurality of power laser light beams and convert the plurality of power laser light beams into the substation electrical power and to transfer the substation electrical power to a battery charger or controller, the battery charger or controller configured to charge the one or more batteries.

6. The wireless optical power network of claim 5, the one or more sink power substations further including one or more sink processors or controllers, one or more sink memory devices, sink computer-readable instructions stored in the one or more sink memory devices, and one or more sink wireless communication transceivers,
    the sink computer-readable instructions executable by the one or more sink processors or controllers to receive one or more sink status parameters or operational measurements and to determine if the sink status parameters or operational measurements are within a specific range and if not, communicating a command, message or signal through the one or more sink wireless communication transceivers to the one or more master power stations to change operations of a power laser module in a master power station.

7. The wireless optical power network of claim 6, wherein the one or more sink status parameters is a battery charge status parameter, and
    wherein the battery charger controller to monitor a battery charging status of the one or more batteries in the one or more sink power substations, the one or more sink processors or controllers to receive the battery charging status parameter and if the battery charging status parameter are greater than an established value, causing the one or more sink processors to communicate commands, messages or signals to the one or more sink wireless communication transceivers to instruct a power laser module in a master power station to turn off or deactivate.

8. The wireless optical power network of claim 6, wherein the one or more sink operational measurements is a current measurement, the one or more sink power substations to further include a current monitor module, wherein the current monitor module is configured to monitor current generated by the laser energy harvesting cell, the one or more sink processors or controllers to receive the current measurement and if the current measurement is not within an acceptable range, causing the one or more sink processors or controllers to communicate commands, messages or signals to the one or more sink wireless communication transceivers to instruct a power laser module in a master power station to adjust power output by a power laser.

9. The wireless optical power network of claim 6, the sink computer-readable instructions to calculate a time of day, and if the time of day is during work hours, the sink computer-readable instructions to cause the one or more sink processors or controllers to communicate commands, messages or signals to the one or more sink wireless communication transceivers to instruct a power laser module in a master power station to turn off or deactivate the power laser.

10. The wireless optical power network of claim 5, the one or more sink power substations or a room including the one or more sink power substations including a room occupancy sensor, the room occupancy sensor configured to determine if individuals are located in the room including the one or more sink power substations and if the room occupancy sensor determines there are individuals in the room, the one or more sink processors or controllers to communicate commands, messages or signals to the one or more sink wireless communication transceivers to instruct a power laser module in a master power station to turn off or deactivate a power laser.

11. The wireless optical power network of claim 1, wherein the plurality of end user devices includes at least one of Internet of Thing (IoT) devices, imaging devices, sensors, actuators, wireless transceiver devices, implantable medical devices, or wearable computing devices.

12. The wireless optical power network of claim 1, wherein the one or more processors or controllers execute the optical power grid management computer-readable instructions to request operating conditions and performance statistics of the power source, the one or more master power stations, the one or more optical distribution devices, and/or the one or more sink power substations or to request deactivation or activation of power laser modules, or to request that a power of a laser device of a master power station be adjusted; and receive and store the performance statistics or operation conditions of power source, the one or more master power stations, the one or more optical distribution devices, and/or the one or more sink power substations in the optical power grid topology database.

13. The wireless optical power network of claim 1, further comprising one or more master power substations, the one or more master power substations coupled to the one or more optical distribution devices and to the one or more sink power substations, the one or more master power substations configured to receive the plurality of laser light beams via the one or more optical distribution devices, to convert the plurality of laser light beams to master substation electrical power and to transfer the master substation electrical power to a plurality of additional end user devices.

14. The wireless optical power network of claim 13, the one or more master power substations configured to transfer the master substation electrical power to the master substation power laser module, to generate a plurality of master substation power laser light beams based at least in part on the master substation electrical power, and to transfer the plurality of master substation power laser light beams to the one or more sink power substations.

15. The wireless optical power network of claim 14, the optical power grid topology database further including device information, parameters, operating conditions, location, and/or performance statistics for the one or more master power substations,
wherein the one or more processors or controllers of the local network server computing device execute the optical power grid management computer-readable instructions to request operating conditions and performance statistics of the one or more master power substations and to receive commands or signals identifying operational parameters or status parameters of the one or more master power substations.

16. The wireless optical power network of claim 14, the optical power grid management computer-readable instructions executable by the one or more processors or controllers of the local network server computing device to receive and store the operational parameters or status parameters of the one or more master power substations in the optical power grid topology database.

17. The wireless optical power network of claim 13, the one or more master power substations including a master power storage module, a master battery charger controller and one or more master batteries.

18. The wireless optical power network of claim 17, the master power storage module including a laser energy harvesting cell, the laser energy harvesting cell configured to convert the plurality of power laser light beams into master substation electrical power and to transfer the master substation electrical power to the battery charger controller, the master battery charger controller configured to charge the one or more master batteries and the one or more master batteries or the master battery charger controller configured to power to the one or more additional end user devices.

19. The wireless optical power network of claim 13, the one or more master power substations including a power source conversion module and a power laser module, the power source conversion module configured to receive the electrical power and the power laser module to generate a plurality of power laser light beams based at least in part on the electrical power.

20. A wireless optical power network for power distribution and charging of a plurality of devices, comprising:
one or more power sources to generate electrical power;
one or more master power stations coupled or connected to the one or more power sources, the one or more master power stations configured to receive the electrical power and to generate a plurality of power laser light beams based at least in part on the electrical power;
one or more optical distribution devices, coupled or connected to the one or more master power stations, the one or more optical distribution devices to receive and transmit the plurality of power laser light beams, wherein one of the more or more optical distribution devices includes an optical splitter and the optical splitter is configured to divide the plurality of power laser light beams of the plurality of power laser light beams and create first split power laser light beams and second split power laser light beams;
one or more sink power substations optically coupled to the one or more optical distribution devices, a first sink power substation of the one or more sink power substations configured to receive the first split power laser light beams and a second sink power substation of the one or more sink power substations to receive the second split power laser light beams via the optical splitter, the first sink power substation configured to convert the first split power laser light beams to first substation electrical power and to transfer the first substation electrical power and the second sink power substation configured to convert the second split power laser light beams to second substation electrical power;

a plurality of end user devices to receive the first substation electrical power or the second substation electrical power in order to charge the plurality of end user devices; and a local network computing device, the local network computing device including one or more processors or controllers, one or more memory devices, and computer-readable instructions stored on the one or more memory devices, the computer-readable instructions executable by the one or more processors or controllers to receive commands or signals identifying operational parameters or status parameters of the one or more master power stations, the one or more optical distribution devices, the one or more sink power substations or the plurality of end user devices, the local network computing device further including a local network interface, a web server interface and one or more data storage devices, the computer-readable instructions executable by the one or more processors or controllers to control operations of the local network computing device, and the one or more data storage devices to include an optical power grid topology database, optical power grid management computer-readable instructions and a machine learning module, the optical power grid topology database including device information, parameters, operating conditions, location, and/or performance statistics for the power sources, the master power stations, the optical distribution devices, and/or the sink power substations under control or in an area of the local network computing device.

\* \* \* \* \*